United States Patent [19]

Quintana

[11] 4,129,161
[45] Dec. 12, 1978

[54] TRACTION DEVICE FOR TIRES

[76] Inventor: Roberto Quintana, 1904 N. 74th Ct., Elmwood Park, Ill. 60635

[21] Appl. No.: 841,744

[22] Filed: Oct. 13, 1977

[51] Int. Cl.² .................. B60C 27/20; B60C 27/04
[52] U.S. Cl. ............................................ 152/225 R
[58] Field of Search ............. 152/220, 225 R, 225 C, 152/226, 227, 228, 229, 230, 174, 181, 217, 218, 219, 208, 213 R, 213 A

[56] References Cited

U.S. PATENT DOCUMENTS

| | | | |
|---|---|---|---|
| 1,777,928 | 10/1930 | Marsch | 152/228 |
| 2,458,522 | 1/1949 | MacKay | 152/229 |
| 2,507,090 | 5/1950 | Brown | 152/225 R |
| 2,729,261 | 1/1956 | Rucker | 152/218 |
| 2,870,814 | 1/1959 | Khachikian | 152/230 X |
| 3,283,796 | 11/1966 | White et. al. | 152/218 |

Primary Examiner—Francis S. Husar
Assistant Examiner—Randolph A. Reese

[57] ABSTRACT

To increase tire traction in snow, mud, etc., traction shoes are mounted so as to overlie the tread of a tire. The traction shoes are connected to a mounting bar which traverses the outside of a vehicle wheel and is held to the wheel by means of chain segments with hooks on the ends, the hooks engaging the back edges of the wheel rim support members.

4 Claims, 5 Drawing Figures

U.S. Patent    Dec. 12, 1978    4,129,161
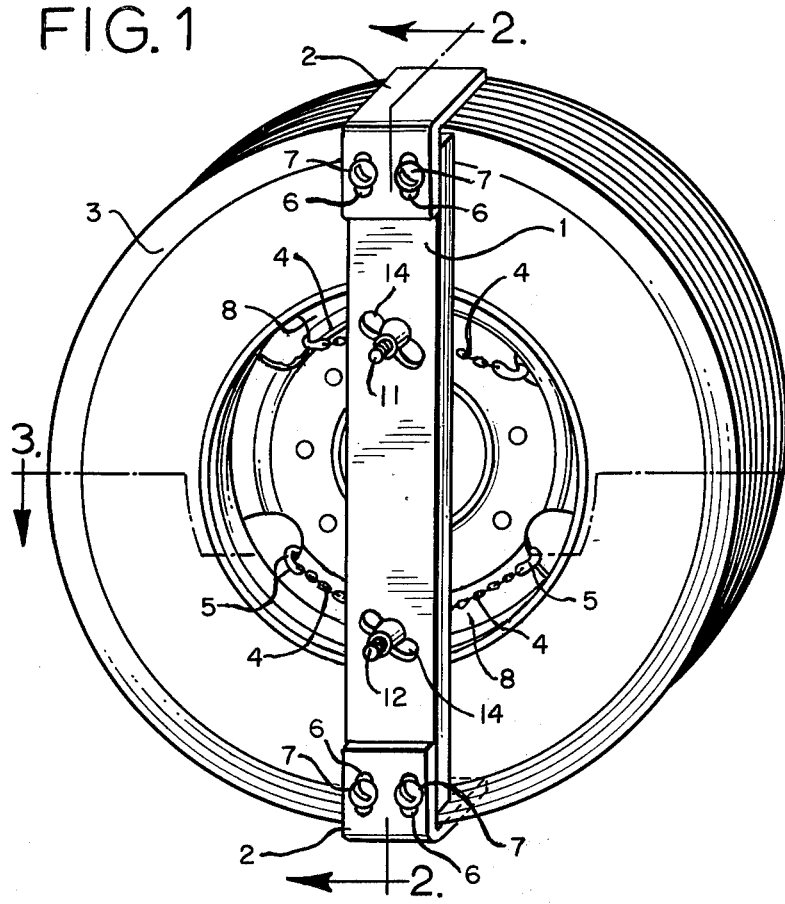
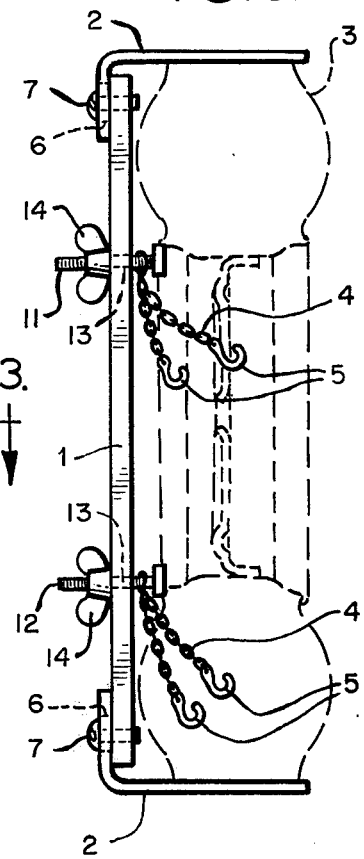
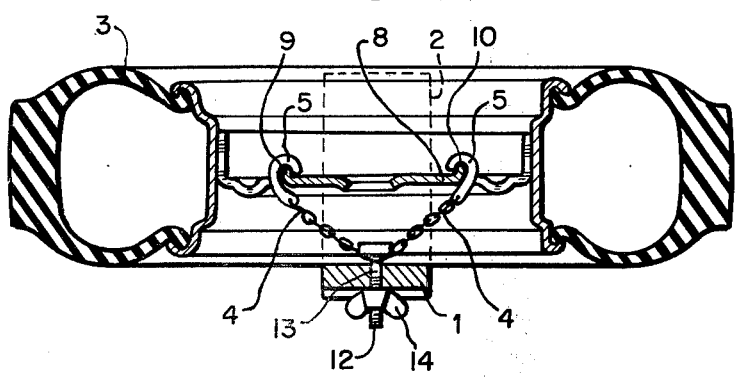
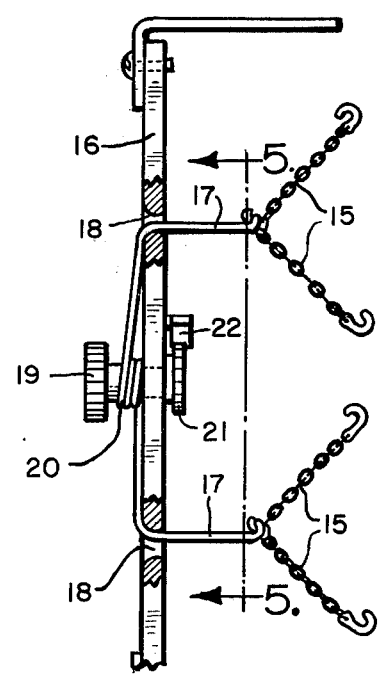
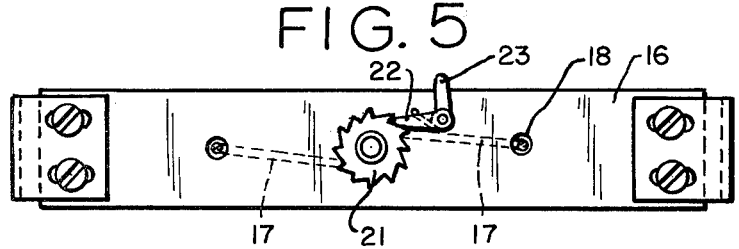

TRACTION DEVICE FOR TIRES

BACKGROUND OF THE INVENTION

This invention relates to traction devices for vehicle tires.

The problem of driving a vehicle in rough terrain, or on icy streets in the winter, or of being mired in snow, mud, sand, etc., has occasioned the development of a number of devices for increasing tire traction beyond what is provided by the rubber tread of a tire. Tire chains are perhaps the best known example. The inconvenience of attaching these is also well known.

Devices that, like the present invention, provide traction shoes across the tire tread for supplemental traction have also been used in the past; but most of these devices suffer from various limitations. Many of these devices are difficult to mount to a wheel, or cannot be mounted while the tire is actually mired in snow or sand.

Some of these prior art devices clamp on to the tire, which can be a somewhat insecure method of fastening the device to the wheel because of the flexing of the tire. Damage to the tire is also a possible result. Examples of such devices are shown in U.S. Pat. Nos. 2,485,544 and 2,597,458, among others.

Another similar type of traction device mounts to the wheel rather than on the tire. This method is believed to be preferable. U.S. Pat. Nos. 1,777,928 and 3,935,891 show examples. Heretofore, however, there has not been a traction device providing traction shoes across the tire tread that mounts to the wheel quickly and easily and with a degree of convenience that might be desired by one mired in snow or the like.

SUMMARY OF THE INVENTION

It is a primary object of the present invention to provide an easily mountable traction device for vehicle tires. The device herein disclosed includes traction shoes overlying the tread of a tire and a mounting bar for positioning the shoes across the tire tread. To the end of providing an easily mountable device, the present invention is secured to the wheel by means of chain segments, or similar strong flexible line segments, having hooks on the ends capable of engaging with portions of the wheel. Means are provided for tensioning the chain segments between the mounting bar and the wheel for holding the device against the wheel.

The device is designed primarily for use with wheels of a type having symmetrically opposed pressed metal rim support members supporting the rim, these members having inward directed edges ideally suited for engagement with hooks; but by varying, if necessary, the number and position of the chain segments, or the position and dimensions of the mounting bar, the device can be adapted for use with most other wheel types.

The traction shoes may be loosely connected to the mounting bar for free slidable motion generally paralleling a wheel diameter so that the shoes follow the tread as the tire flexes.

Further features and benefits of the present invention will be apparent from the following description with reference to the accompanying drawings.

BRIEF DESCRIPTION OF THE DRAWINGS

FIG. 1 is a perspective view of the invention mounted on a wheel.

FIG. 2 is a cross sectional view of the invention taken alone line 2—2 of FIG. 1.

FIG. 3 is a cross sectional view of the invention along line 3—3 of FIG. 1.

FIG. 4 is a side view of the invention showing an alternate tensioning device.

FIG. 5 is an end view of the invention taken from line 5—5 of FIG. 4.

DESCRIPTION OF THE PREFERRED EMBODIMENTS

Referring to FIGS. 1 and 2, mounting bar 1 traverses the outside of the wheel with its center positioned approximately next to the center of the wheel and its ends extending approximately to the tread of the tire. Bar 1 has connected to its ends at right angles traction shoes 2, which overlie the tread of tire 3 for supplemental traction. Chain segments 4, which have hooks 5 on their ends, secure the mounting bar to the wheel.

Traction shoes 2 may be loosely connected to the mounting bar for free slidable motion approximately paralleling a wheel diameter. Shoes 2 have elongated slots 6 engaged by screws 7, the screws being threadably fastened to bar 1. This arrangement enables the traction shoes to follow the tread of the tire as the tire flexes. This also allows the use of comparatively light materials in the construction of the invention, since the tire tread then supports the traction shoes, rather than the mounting bar and chain segments, as would be the case if the shoes were rigidly mounted to the mounting bar.

The present invention is adapted primarily for wheels of the type having symmetrically opposed pressed metal rim support members 8 (FIG. 1), and so four chain segments 4 are shown in the preferred embodiment pictured in FIGS. 1 and 2. By "rim support members" are meant those stubby, broad spoke-like sections of the wheel upon which the rim is supported and against which the rim abuts. In the example of FIG. 1, these would be the four sections of the wheel lying generally between the holes through which hooks 5 pass.

FIG. 3 is a cross section through one of these rim support members 8. In FIG. 3, it can be seen that member 8 has a left edge 9 and a right edge 10 that are easily engaged by hooks 5. It is to be understood that "left edge" and "right edge" are terms used as a convenience to refer to opposite sides of the rim support members. The invention is herein described and claimed as though attached to a wheel in the position of rotation shown in FIGS. 1-3.

For tensioning the chain segments 4 (see FIGS. 2 and 3), a first bolt 11 and a second bolt 12 are provided to which the chain segments are attached by the ends which lie opposite the hooks. The chain segments are attached to the heads of the bolts on the inside of the mounting bar. Mounting bar 1 has two holes 13 positioned approximately next to the centers of support members 8 through which bolts 11 and 12 freely pass. Butterfly nuts 14 engage bolts 11 and 12 on the outside of the mounting bar. Chain segments 4 are tensioned in response to tightening of the butterfly nuts 14, thus securing the traction device to the wheel.

An alternate tensioning means is shown in FIGS. 4 and 5. Chain segments 15 are attached on the inside of bar 16 by the ends which lie opposite the hooks to the ends of tensioning cable 17, which passes through guide holes 18 to the outside of the bar. In response to turning of handle 19, cable 17 is wound onto shaft 20, thus tensioning the chain segments. Rachet 21 and pawl 22 maintain the tension. Handle 23 is used to disengage the pawl from the rachet.

I claim:

1. A tire traction device for use primarily with wheels of the type having symmetrically opposed pressed metal rim support members which comprises:

a mounting bar for traversing the outside of a wheel with the center of the bar positionable approximately next to the center of the wheel and the ends of the bar extending approximately to the tread of the tire;

a traction shoe connected to each end of the mounting bar at right angles to the bar so as to overlie the tire tread;

a first and a second flexible line segment;

a hook attached to the end of each of the first and second line segments, one hook being capable of engaging with the edge of a first rim support member of the pressed metal type and disposed to the left of said mounting bar, and the other hook being capable of engaging with the edge of the first rim support member and disposed to the right of said mounting bar;

a third and a fourth flexible line segment;

a hook attached to the end of each of the third and fourth line segments, one hook being capable of engaging with the edge of a second rim support member symmetrically opposed to the first rim support member and disposed at the left side of said mounting bar, and the other hook being capable of engaging with the edge of the second rim support member and disposed at the right side of said mounting bar; and means mounted on the mounting bar and attached to the ends of the flexible line segments opposite the hooks for tensioning the segments between the wheel and the mounting bar, whereby the traction device is secured to the wheel.

2. The tire traction device of claim 1, wherein the traction shoes are loosely connected to the mounting bar for free slidable motion generally paralleling a wheel diameter, so that they can follow the tread as the tire flexes.

3. The tire traction device of claim 1, wherein the tensioning means comprises:

a first bolt to which the first and second flexible line segments are attached on the inside of the mounting bar by the ends which lie opposite the hooks, the bolt passing freely through a portion of the mounting bar defining a hole, the hole being positionable approximately next to the center of the first rim support member;

a first butterfly nut engaging the first bolt on the outside of the mounting bar, whereby the first and second flexible line segments are tensioned in response to tightening of the butterfly nut;

a second bolt to which the third and fourth flexible line segments are attached on the inside of the mounting bar by the ends which lie opposite the hooks, the bolt passing freely through a portion of the mounting bar defining a hole, the hole being positionable approximately next to the center of the second rim support member; and a second butterfly nut engaging the second bolt on the outside of the mounting bar, whereby the third and fourth flexible line segments are tensioned in response to tightening of the butterfly nut.

4. The tire traction device of claim 1, wherein the tensioning means comprises:

a tensioning cable, one end of which is attached on the inside of the mounting bar to the ends of the first and second flexible line segments, and the other end of which is similarly attached to the third and fourth segments, the cable then passing through portions of the mounting bar defining guideholes to the outside of the bar, the guideholes being positionable approximately next to the centers of the symmetrical opposed rim support members;

a shaft rotatably connected to the mounting bar approximately in its center to which the tensioning cable is attached in such a manner that as the shaft is turned the cable is wound thereon and the cable ends drawn in to the shaft;

a handle for turning the shaft; and a rachet and pawl arrangement on the shaft for maintaining tension.

* * * * *